June 15, 1965 C. C. BAUERLEIN 3,188,827
AUTOMATIC ICE MAKER HAVING A THERMALLY SENSITIVE POWER UNIT
Filed June 17, 1963 7 Sheets-Sheet 1

INVENTOR.
Carl C. Bauerlein
BY
ATTORNEYS

INVENTOR.
Carl C. Bauerlein
BY
ATTORNEYS

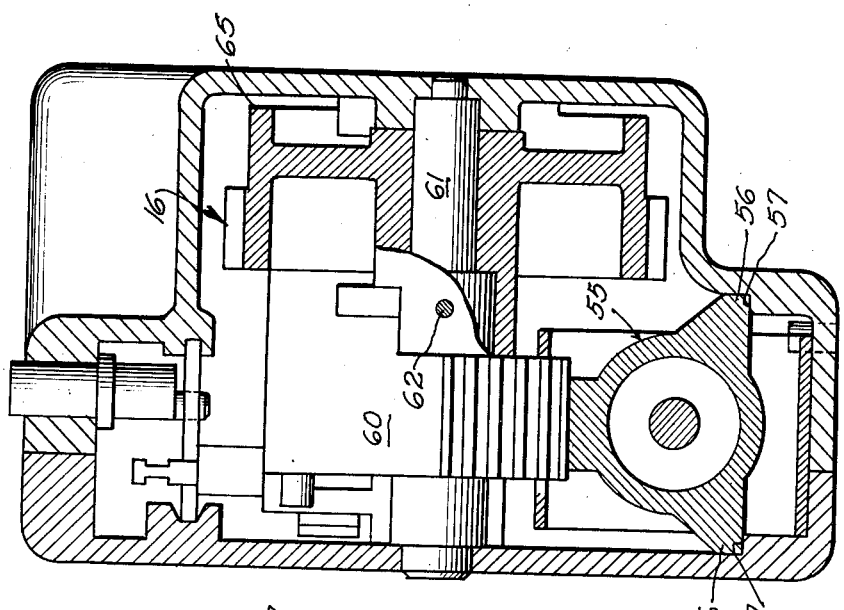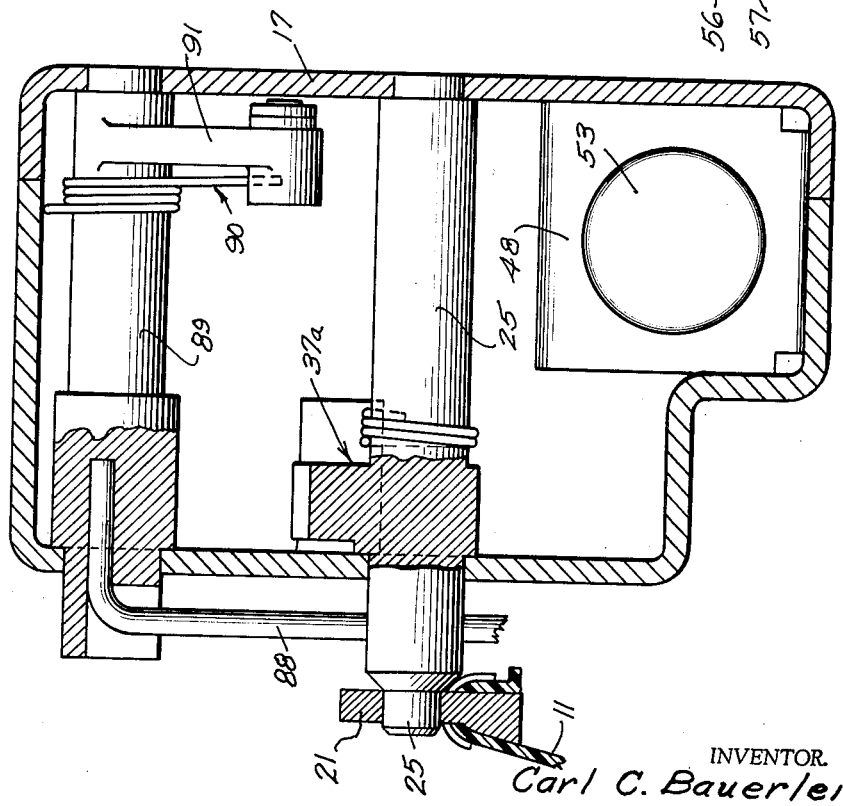

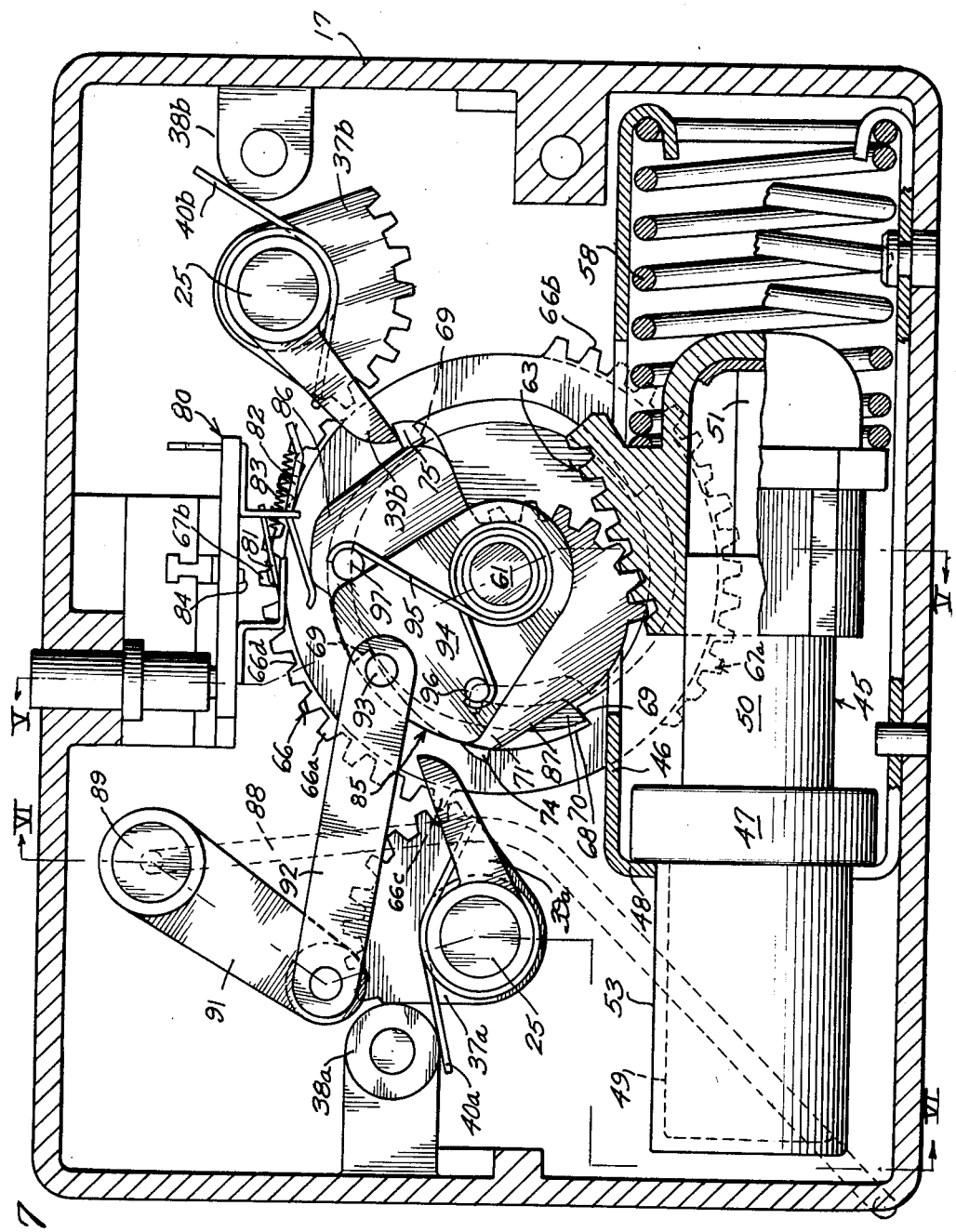

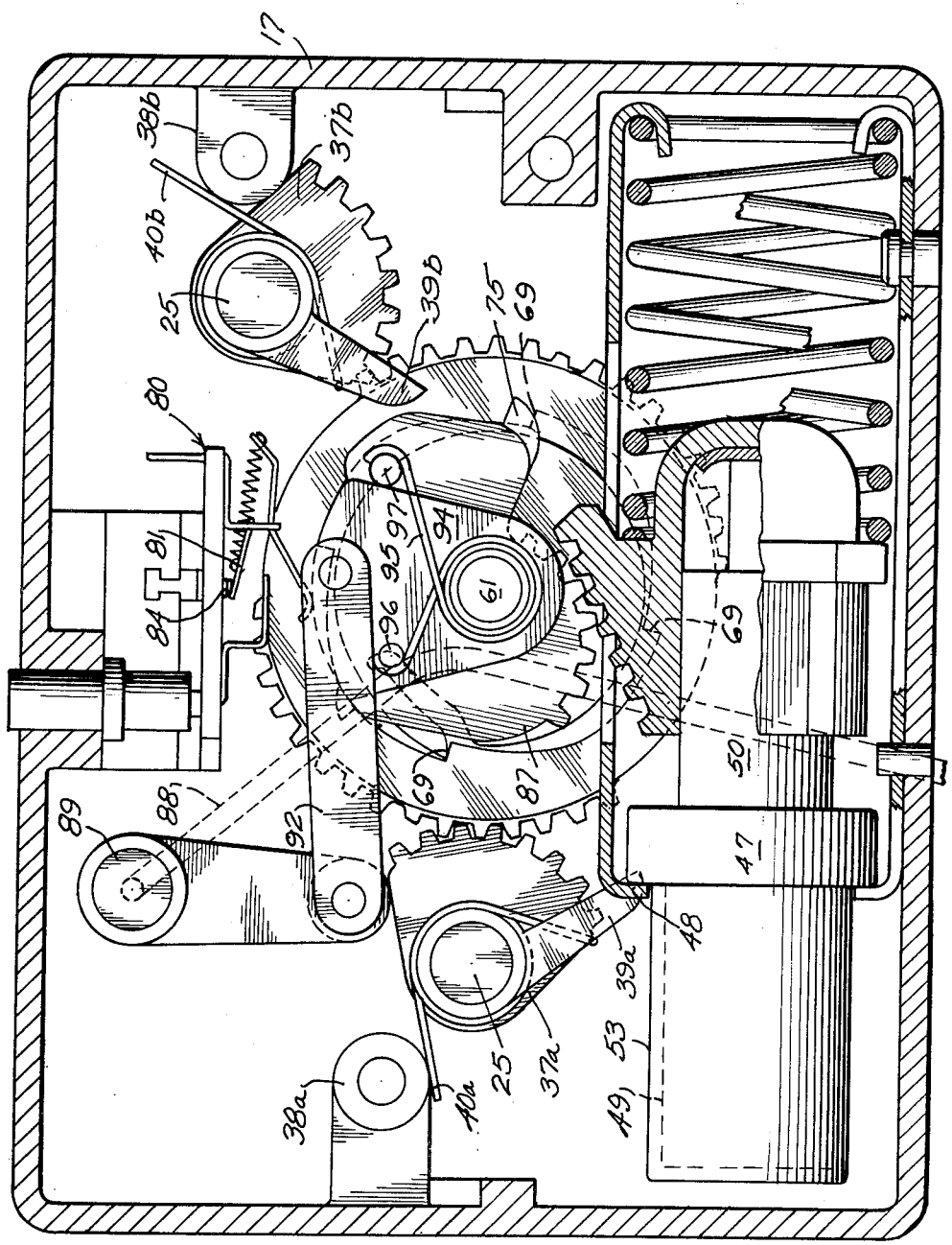

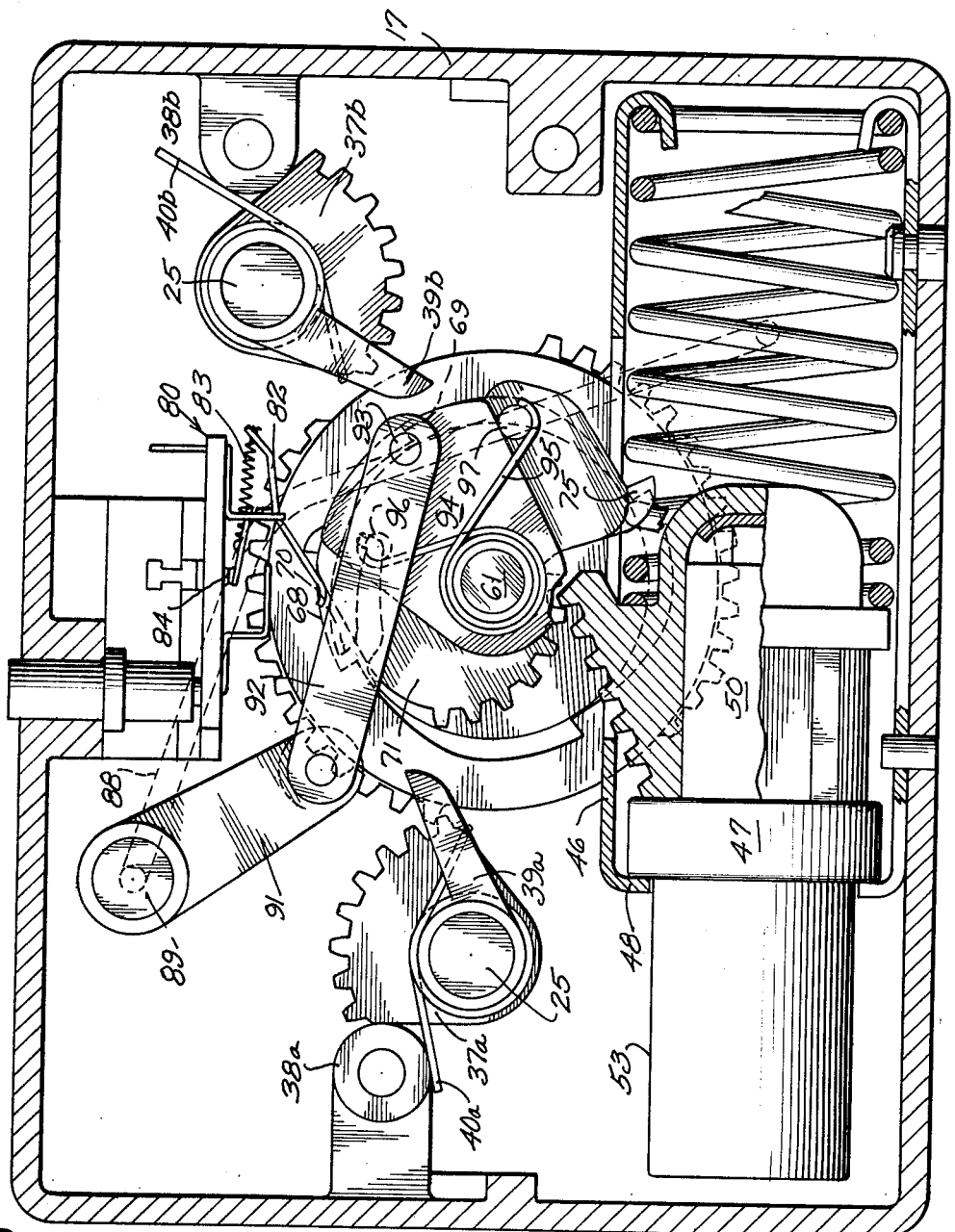

United States Patent Office 3,188,827
Patented June 15, 1965

3,188,827
AUTOMATIC ICE MAKER HAVING A THERMALLY SENSITIVE POWER UNIT
Carl C. Bauerlein, Clearwater, Fla., assignor to The Dole Valve Company, Morton Grove, Ill., a corporation of Illinois
Filed June 17, 1963, Ser. No. 288,360
7 Claims. (Cl. 62—137)

This invention relates to automatic ice making assemblies and more particularly relates to an ice making apparatus of the type that is to be installed in a freezing compartment of a household refrigerator.

More specifically the invention is directed to an ice making apparatus of the type employing flexible trays which can be overturned and twisted to effect ejection of ice blocks therefrom into a suitable collection tray. My invention is primarily directed to the apparatus for controlling filling, freezing and subsequent ejection of ice blocks from flexible ice trays in an automated fashion.

Generally speaking, an ice making assembly constructed in accordance with the principles of my invention will have a pair of flexible ice trays rotatably mounted along their longitudinal axes within the freezing compartment of the refrigerator. A single temperature sensitive power unit or thermal sensitive element is employed to control filling and rotation of the trays as well as ejection of ice blocks therefrom in proper sequence and at the proper time. Ice level sensing means are employed to de-energize the entire ice making apparatus when the ice block collection tray has been filled to a predetermined point.

It is therefore a principal object of my invention to provide an improved automatic ice making apparatus employing flexible ice trays and employing a thermal sensitive element for controlling operation of the apparatus.

More specifically my invention is directed to an improved mechanism for intermittently transmitting rectilinear movement of the power member of a thermal sensitive element to one or the other of two shafts connected to different ice trays for rotating those trays in proper sequence and at the proper times in their freezing cycles and for properly positioning the trays during filling, freezing and overturning thereof.

These and other objects and advantages of my invention will become apparent from time to time as the following specification proceeds and with reference to the accompanying drawings, wherein:

FIGURE 5 is a vertical sectional view through the casing of the ice making assembly which is taken along lines V—V (not shown) of FIGURE 7;

FIGURE 6 is an other vertical sectional view through the casing which is taken along lines VI—VI (not shown) of FIGURE 7;

Figure 10:
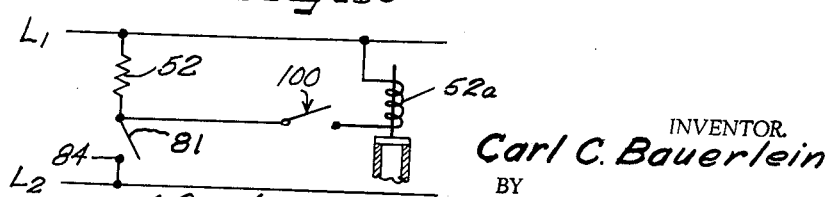

FIGURES 7 and 8 and 9 are vertical sectional views taken along a plane perpendicular to the plane of the views shown in FIGURES 5 and 6 and showing the various parts of the ice making assembly in successive operating positions; and FIGURE 10 is a schematic view of the electrical circuit contained within this ice making apparatus.

Figure 1:
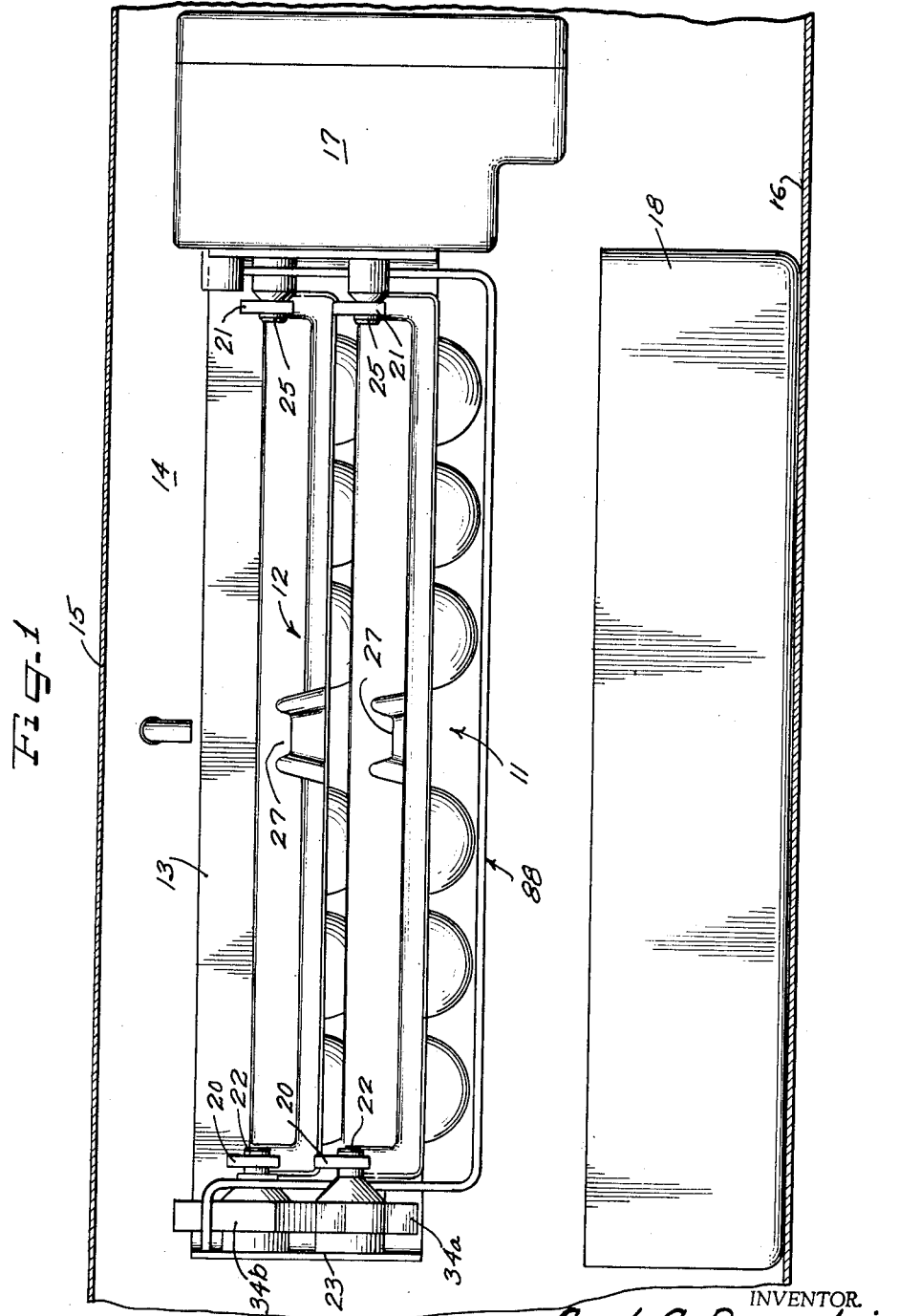
FIGURE 1 is a side elevational view of an ice making apparatus constructed in accordance with the principles of my invention which is shown mounted in the freezing compartment of a household refrigerator.

Referring initially to FIGURE 1, the ice making apparatus 10 of my invention consists of a pair of ice trays 11, 12 which are mounted for rotatable movement about their longitudinal axes on a bracket 13 and which are positioned within a freezing compartment 14 defined by the wall 15 and freezer floor 16 of a household refrigerator. A casing 17 is secured to the wall of the freezing compartment and contains the components which serve to control filling and twisting of the ice trays 11, 12. A collection tray 18 is positioned on the freezer floor 16 directly beneath the ice trays 11, 12 and serves as a storage bin for ice blocks ejected from the trays.

Figure 3:
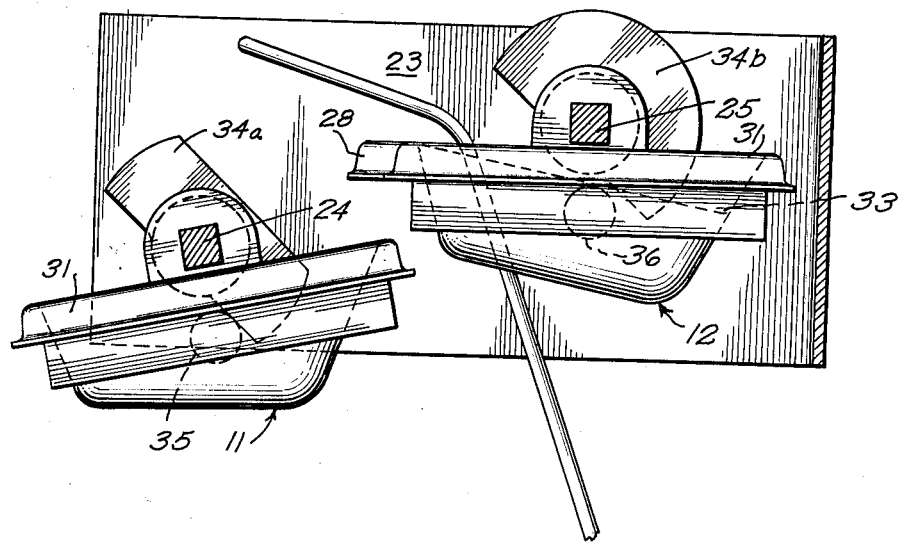
FIGURE 3 is a vertical sectional view through the ice tray mounting shaft shown in FIGURE 2 and taken along lines III—III of FIGURE 2 and showing the ice trays in elevation in a first position.

The ice trays 11, 12 have the same general configuration and are formed with upstanding tabs 20 and 21 at the opposite ends thereof. The tab 20 has circular apertures formed therein whereas the tabs 21 have square or irregularly shaped apertures formed therein. The apertures formed in the tabs 20 serve to receive the free ends of shaft 22 which are secured to and extend from the outer end 23 of the bracket 13 to support the free ends of the ice trays 11, 12. Shafts 25, 25 extend from the casing 17 into the apertures formed in the trays 11, 12, respectively and these shafts have ends which are complementary with the apertures in the tabs so that the shafts are drivingly connected to the trays. It will be observed that the trays are thus supported for pivotal movement about their longitudinal axes and, as best seen in FIGURES 1 and 3, the tray 12 is mounted somewhat above and rearwardly of the tray 11.

Figure 4:
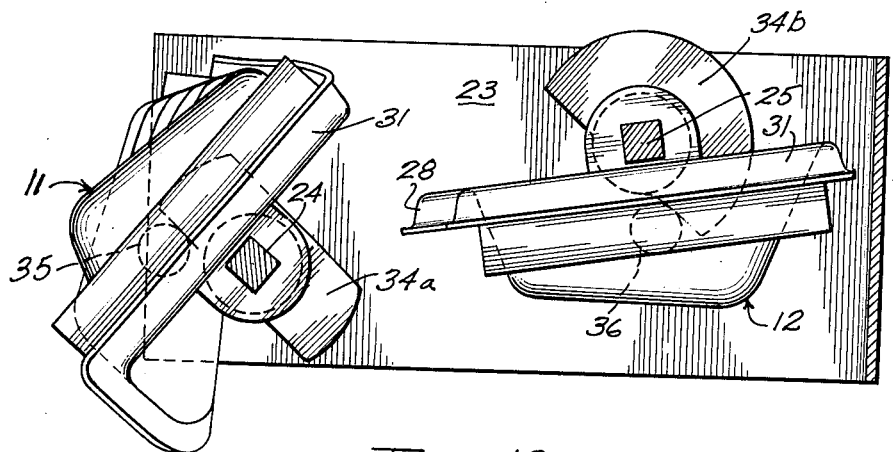
FIGURE 4 is a view similar in nature to FIGURE 3 but which shows the trays in different positions from those of FIGURE 3.

The trays 11, 12 are formed of a plastic, flexible, material such as high density or linear polyethylene and will effect the ejection of ice blocks therefrom when turned and twisted in the manner shown in the left-hand portion of FIGURE 4.

Figure 2:
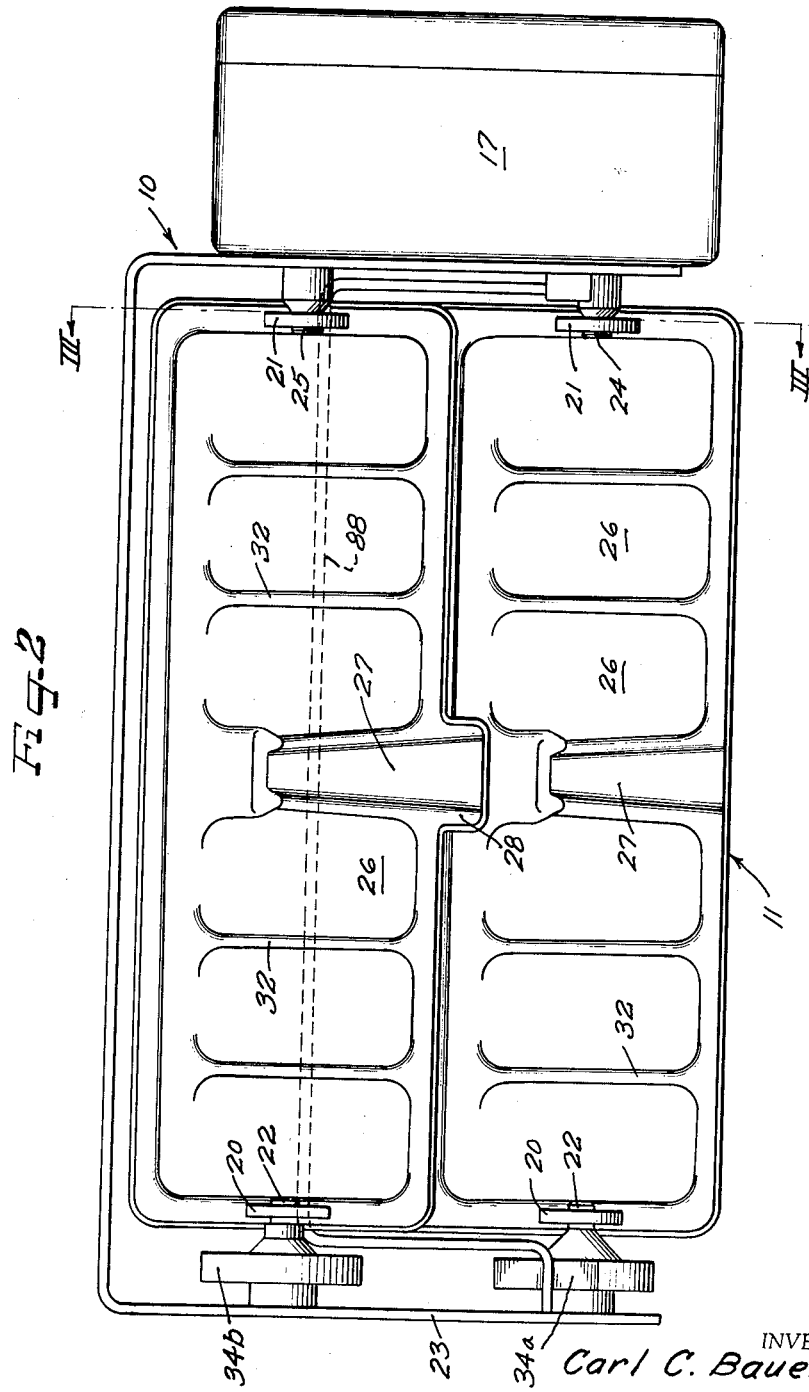
FIGURE 2 is a top plan view of the ice making apparatus showing FIGURE 1.

It will be observed that the trays each have a plurality of ice mold wells 26 formed therein and that a trough 27 is formed transversely across each of the trays and centrally thereof. The trough 27 in the tray 12 terminates in a lip 28 which, in the position of the trays shown in FIGURES 2 and 3, overhangs the lower tray 11. It will be noted that the base 30 of each of the mold wells in each of the trays is set at an angle with respect to the plane of the bead or lip 31 of the trays. Likewise, the lip of the partitioning walls 32 which divide the trays into a plurality of mold wells, are arranged substantially in parallel with the bases of the mold wells so that troughs 33 are formed between the lips of the partitions 32 and the side walls of the trays to carry water from one mold well to another. When the tray is in the position shown in the right hand side of FIGURE 3, water directed to the trough 27 from a source above the trough will flow into the mold wells immediately on each side of the trough due to the rearward incline of the trough and will pass from these wells to the other mold wells through the trough 33. If the tray is then rotated counterclockwise a few degrees to the position shown in the left hand portion of FIGURE 3 the plane of the bases of the mold wells and the plane of the lips of the partitioning walls will be horizontal and there will be no standing water between any two adjacent mold wells. In many ice trays interconnecting weirs are provided to direct the water from one mold well to another during filling of the tray but a distinct disadvantage of such weirs lies in the fact that the ice frozen therein interconnects adjacent ice blocks with one another and hinders ice blocks ejection.

Referring again to FIGURES 3 and 4, stops 34a and 34b extend outwardly from the shaft 22 and are rigidly affixed in position to the leg 23 of the bracket 13 and serve to limit the degree of rotatable movement of the trays 11, 12. Shafts 35 protrude from the free ends of the ice trays and contact the stops in one or the other of the extreme rotated positions thereof as shown in the left hand portions of FIGURES 3 and 4, in a manner which is well understood by those skilled in this art.

The entire ice tray assembly including the casing 17 and the bracket 13 is mounted within the freezing compartment of the refrigerator in any suitable manner with both the casing and the trays positioned within the freezing compartment.

Referring now to FIGURE 7 the mechanism for controlling the filling, freezing, and ejection operations is contained within the casing 17. The shaft 25 is journalled within aligned apertures formed in opposite side walls of the casing 17 (FIGURE 6) and has a sector gear 37a formed integrally therewith. It will be appreciated that there are two shafts 25 journalled within the casing 17 in spaced relation to one another on parallel axes and that the shafts 25 have identical sector gears 37a and 37b formed thereon. A boss 38 is formed within the casing 17 and acts as a stop for sector gear 37a when that gear is in the counterclockwise rotated position shown in FIGURE 7. A lever arm 39a is formed integrally with the gear 37a and extends radially from the shaft 25 for purposes hereafter to be described. A torsion spring 40a has one end hooked over the arm 39a and has its opposite end seated on the boss 38 to normally bias the arm 39a and the sector gear 37a in the counterclockwise rotated direction. Likewise, the sector gear 37b has an arm 39b formed integrally therewith and the arm and gear are biased in a counterclockwise rotated direction by a torsion spring 40b which is connected to the arm 39b and is bottomed on a boss 38b.

The ice trays 11, 12 are so related with the sector gears 37a and 37b that when the sector gears are in the positions shown in FIGURE 7, the ice trays will be positioned as shown in FIGURE 3. In this position of the ice trays it will be observed that the tray 11 is in a "freeze" position with the plane of the bases of the ice mold wells lying on the horizontal. On the other hand, the ice tray 12 in FIGURE 3 is positioned with its lip 31 in a horizontal plane and with its mold well bases at an angle to the horizontal so that it is in the "fill" position.

Since the cycle of operation of each of the trays 11, 12 is the same, only the cycle of the tray 11 will be discussed here. It will suffice initially to state that when the tray 11 is in the position shown in FIGURE 3, with the sector gear 37a in the position shown in FIGURE 7, the water contained within the ice tray is freezing into ice blocks.

A temperature sensitive power unit 45 is mounted within a cage 46 on the inside of the casing 17 with a collar 47 bottomed on an inturned annular flange 48 of the cage 46. The cage is secured to one side wall of the casing 17 and is thereby maintained in the fixed position shown in FIGURE 7. The temperature sensitive power unit 45 is of a type well known in the art and includes a temperature sensitive portion 49, a guide 50, and a power member or piston 51, in addition to the collar 47. The temperature sensing portion 49 has a heater coil 52 wound therearound (shown diagrammatically in FIGURE 10) and an insulating cap 53 is mounted thereover to form an analoging power unit. Energization of the coil 52 (not shown) causes extensible movement of the piston 51. A head 55 is mounted on the outer end of the power member 51 and is guided for slidable movement on the guide 50. As best shown in FIGURE 5 the hat 55 also has a pair of legs 56 formed integrally therewith which extend in opposite directions and which slidably contact mating guideways 57 formed along a side wall of the casing to prevent turning of the hat 55 on the power member 51. A compression spring 58 is interposed between the hat 55 and a spring seat 59 formed on the end of the cage 46. Consequently, when the heater coil 52 is deenergized and the temperature sensing portion 49 is permitted to cool the spring 58 will retractibly move the hat 55 and the power member 51 with respect to the guide 50.

A spiral-form drive gear 60 is mounted on and pinned to a shaft 61 which, in turn, has its opposite ends journalled in opposed side walls of the casing 17 as is shown in FIGURE 5. A pin 62 interconnects the drive gear with the shaft. A sloping gear rack 63 is formed integrally with the hat 55 and is in mesh with the teeth of the spiral-form drive gear 60 so that rectilinear movement of the hat 55 will effect rotary movement of the gear 60. A multi-faced gear 65 is also mounted on the shaft 61 but is arranged to have rotatable movement relative thereto and this gear has separate sets of driving teeth formed therearound in different planes thereof. Teeth 66a and 66b are formed in one plane at diametrically opposed points on the gear 65 and are adapted to mesh with the sector gear 37a. The teeth 66a run from a point 66c to a point 66d along the surface of the gear 65 and the teeth 66b run through the same arc on the opposite side of the gear 65. Teeth 67a and 67b run through similar arcs at diametrically opposed points on the gear 65 and in a different plane than the teeth 66a and 66b. The teeth 67a and 67b are engageable with the sector gear 37b. FIGURE 5 illustrates the different planes that the teeth 66 and 67 are in. The driving teeth 66 are formed around the gear on the left hand portion of the gear 65 as is shown in FIGURE 5. The teeth 67 are formed on the right hand half of the gear 65 in FIGURE 5 but cannot actually be seen in this view.

The sector gears 37a and 37b are likewise positioned in displaced planes and are so arranged with respect to the double faced gear 65 that the driving teeth 66 can mesh with the sector gear 37a while the driving teeth 67 can mesh with the teeth of the sector gear 37b. In effect, one set of driving teeth on the double faced gear is effective to mesh with the teeth on one of the sector gears only to provide a separate intermittent drive for that sector gear. Consequently, counterclockwise rotation of the double faced gear 65 from the position shown in FIGURE 7 will effect clockwise rotatable movement of the sector gear 37a. Counterclockwise rotatable movement of the double faced gear 65 is effected in the following manner.

The inner surface of the double faced gear 65 comprises a series of relieved portions 68 which terminate abruptly in radially directed shoulders 69. The relieved portions 68 are somewhat spiral-form in configuration so that each of these surfaces runs from the base of one shoulder to the upper edge of the next shoulder.

The spiral-form drive gear 60 has a finger 70 formed integrally therewith which protrudes from the wall of the remainder of the drive gear sufficient to abut the shoulders 69. If the drive gear 60 is formed of some plastic material having some resiliency and not subject to cracking such as "Delrin" or "Celcon" and if the finger 70 is relieved sufficiently as at 71, then the other end of the finger 70 would be able to move radially with respect to the drive gear 60.

Consequently, clockwise rotational movement of the drive gear 60 will move the finger 70 along the surface 68 and the finger 70 will gradually be urged inwardly until the outermost end of the finger snaps over the next succeeding shoulder 69. Subsequent counterclockwise rotatable movement of the drive gear 60 will act through the finger 70 and shoulder 69 to urge the double faced gear 65 in a counterclockwise direction. The shoulder 69 and integral finger 70 provide therefor a simple one-way clutch arrangement.

From the foregoing it will be observed that retractible movement of the power member 51 will act through the gear 63 to urge the gear 60 in a clockwise direction. Complete retractible movement of the power member 51 will move the finger 70 from one shoulder 69 to and slightly past the next succeeding shoulder 69. Subsequent extensible movement of the piston 51 will act through the gear 63 to move the gear 60 in a counterclockwise direction and will also act through the finger 70 to move the double faced gear 65 in the same or counterclockwise direction.

Rectilinear reciprocal movement of the piston 51 is therefore translated into oscillating movement of the gear 60 which acts through the finger 70 to effect intermittent unidirectional rotary movement of the double faced gear 65.

Attention is now direction to the fact that a pair of nibs 74 and 75 are formed integrally with and protrude from opposite sides of the gear 60 and that these nibs are positioned respectively in the planes of the lever arms 39a and 39b. In the position of the gear 60 shown in FIGURE 7, the nib 75 abuts the arm 39b and holds the sector gear 37b in the position shown therein against the bias of the spring 40.

A snap action switch 80 is mounted on the casing 17 and has the well-known snap blade 81 and snap lever 82 interconnected with one another by means of an over-center spring 83. The snap blade 81 is arranged to move in and out of engagement with a stationary contact 84 to effect energization and deenergization of the heater coil 52 and a water valve solenoid coil 52a in the manner shown diagrammatically in FIGURE 10. The snap lever 82 is engageable with a switch-cam surface 85 formed along a side wall of the drive gear 60. The switch-cam surface 85 has a high lobe 86 and a drop-off 87. When the snap lever 82 rests on the high lobe 86 the circuit is open and when the snap lever drops into the drop-off 87 the circuit is closed. The snap switch 80 and switch-cam surface 85 are so arranged with respect to one another that the switch will remain in whatever its last previous position was as long as the snap lever 82 is riding on the switch-cam surface intermediate the high lobe 86 and the drop-off 87.

Assuming that the various parts of the mechanism are in the positions shown in FIGURES 3 and 7, the cycle of operation of the ice maker is as follows. The ice tray 12 has just been filled with water while the tray 11 contains water which is already partially frozen into an ice block. The snap lever 82 is in engagement with the high lobe 86 and the heater coil circuit is therefore broken. Since the heater coil is deenergized and the casing 17 is positioned within the freezing compartment, the thermally expansible material in the power unit 45 tends to cool and decrease in volume. The insulating cap 53 slows this cooling sufficiently so that the power unit cools in somewhat more than half the time it takes water to freeze completely within one of the ice trays; ice harvesting taking place in alternate trays each cycle. Upon cooling of the power unit the spring 58 acts to retractibly move the piston 51 and to thereby rotate the drive gear 60. As has already been pointed out, the snap lever 82 will ride along the switch-cam surface 85 but the switch will remain in the open circuit position. When the snap lever 82 falls off the surface 85 and the power member has moved to its retracted position, the switch will close and the heater coil 52 will be energized to initiate the power stroke of the unit 47.

The switch also energises a solenoid which permits entry of water into the slug valve chamber where it is retained during the heating cycle of approximately 2 minutes. When the switch circuit is opened, the water valve solenoid coil is de-energized; this permits the charge of water to be expelled from the slug valve chamber and to fill the appropriate tray. By this means the entire operation is controlled by a single switch. FIGURE 8 illustrates the position of the various elements of the mechanism when the power unit 45 is half way through a heating cycle. Counterclockwise rotation of the drive gear 60 will act through the finger 70 to rotate the double faced gears 65 in a counterclockwise direction to effect clockwise rotatable movement of the sector gear 37a. Such movement of this latter gear will act to rotate the shaft 25 and the tray 11.

As the power unit 45 continues to heat, the piston 51 will move outward toward the right, and the double faced gear 65 will continue to rotate the sector gear 37a and the tray connected therewith until the tray has been distorted in the manner shown in FIGURE 4. It will be observed that the distortion of the tray 11 shown in FIGURE 4 results from the fact that the sector gear 37a moves through a considerably greater arc than the outer end of the tray due to the fact that the stop-pin 35 contacts this stop 34a and prevents such a marked degree of rotatable movement of the outer end of the ice tray.

Upon cooling of the power unit once again, the spring 58 retractibly moves the power member 51 and such movement thereof urges the scroll gear 60 in a clockwise direction until the finger or tongue 70 snaps over and passes the next successive shoulder 69 in a clockwise rotated position from that which it is shown as engaging in FIGURE 7. It will be understood that a ratchet mechanism associated with the gear 65 prevents this gear from itself moving in a clockwise direction. During this period of rotation the sector gear 37b is moved from the position shown in FIGURE 7 to the position shown in FIGURE 8 as the nib 75 is moved in a clockwise direction. Such movement of the sector gear 37b of course permits the tray 12 to rotate from the position shown in FIGURE 3 to the position shown in FIGURE 4 (that is, from the "fill" position to the "freeze" position). When the power unit 45 has cooled completely and the spring 58 has returned the piston 51 to the position shown in FIGURE 8, the snap lever 82 will have fallen from the switch cam surface 85 to the drop-off 87 and the heater coil circuit will then be closed. It is important to understand that the switch cam surface 85 has the effect of maintaining the switch in its last previous position and that the contact 81 and 84 will remain open from the time when the lever was on the cam lobe 86 and during the time that it travels along the switch cam surface 85 until it reaches the drop-off 87.

It will be observed that when the power member 51 nears its most extended point, the mutilated teeth 66a will permit the sector gear 37a to be returned in a counterclockwise direction by the torsion spring 40. At this point in the cycle of operation, however, the nib 74 will be in the path of return movement of the other free end of the lever arm 39a and will hold the sector gear 37a in the top or "fill" position much like a sector gear 37b is shown as being held in FIGURE 7.

An ice level sensing arm 88 extends from and is keyed to a shaft 89 which is journalled for pivotal movement within the casing 17. The sensing arm has its free end journalled for rotatable movement in the leg 23 of the bracket 13 and is adapted to swing over the collection tray 18 to sense the level of ice therein. An arm 91 is formed integrally with and extends from the shaft 89 and this arm has a link 92 pivotally connected to the outer end thereof which link, in turn, is pivotally connected at 93 to a fantail 94 which is pivotally mounted for relative rotational movement on the shaft 61. A torsion spring 95 interconnects pins 96 and 97 which are mounted on the fantail 94 and the gear 60 respectively, to normally urge the fantail 94 into engagement with the pin 97 in the manner shown in FIGURE 7 and thus act also to bias the shaft 89 in a counterclockwise direction.

The outer edge of the fantail 94 is substantially coincident with the switch cam surface 85. In normal operation the fantail 94 simply follows the gear 60 and each time it rotates to the position shown in FIGURE 9 from the position shown in FIGURE 7 the level sensing arm 88 sweeps above the collection tray 18. However, if the collection tray becomes filled to the point in which ice begins to rise above the lip of the tray the pivotal movement of the sensing arm 88 will be impeded. When the sensing arm contacts the ice, the arm and therefore the fantail 94 will be maintained in an intermediate position although the gear 60 continues to rotate in a clockwise direction as the power unit 45 cools.

It will be appreciated that the curved outer surface of the fantail 94 is in the same plan as the snap lever 82 of the switch 80 so that when the gear 60 has rotated to the position shown in FIGURE 8, the presence of the fantail 94 in its intermediate position will prevent the snap lever 82 from following its switch cam surface down to the drop-off 87 and the circuit to the heater coil 52 will not be closed. As a result, further energization of the heater coil and further operation of the ice making apparatus will be prevented until the ice has been removed from the path of the arm 88.

It will be understood that this embodiment of my invention has been used for illustrative purposes only and that various modifications and variations in the invention may be effected without departing from the spirit and scope of the novel concepts thereof.

I claim as my invention:

1. An ice making apparatus comprising:
   a support,
   an ice tray mounted for rotatable movement on said support and within a freezing compartment, wherein ejection of ice blocks from said tray is effected by rotating said tray through a predetermined arc,
   a sector gear connected to and co-rotatable with said tray,
   a second gear rotatably mounted on said support and movable through a 360° arc,
   gear teeth formed on said second gear about a portion only of the circumference thereof and positioned in mesh with said sector gear,
   a drive gear,
   an oscillatable one-way clutch interconnecting said drive gear and said second gear,
   a rectilinearly movable gear rack drivingly connected with said drive gear to oscillate said drive gear,
   and power means for effecting rectilinear movement of said gear rack.

2. An ice making apparatus comprising:
   a support,
   an ice tray mounted for rotatable movement on said support and within a freezing compartment, for ejecting ice blocks from said trays effected by rotating said trays through a predetermined arc,
   a plurality of mold wells formed within said tray,
   a water trough formed along one side of said tray for carrying water between adjacent molds,
   means for filling said tray with water,
   means for tipping said tray during freezing of the water therein to raise said trough above the level of water within said mold,
   a sector gear connected to and co-rotatable with said tray,
   a second gear rotatably mounted on said support and movable through a 360° arc,
   gear teeth formed on said second gear through a portion only of the circumference thereof and positioned in mesh with said sector gear,
   a drive gear,
   an oscillatable one-way clutch interconnecting said drive gear and said second gear,
   a rectilinearly movable gear rack drivingly connected with said drive gear to oscillate said drive gear,
   and power means for effecting rectilinear movement of said gear rack.

3. An ice making apparatus comprising:
   a support,
   an ice tray mounted for rotatable movement on said support and within a freezing compartment, wherein ejection of ice blocks from said tray is effected by rotating said tray through a predetermined arc,
   a sector gear connected to and co-rotatable with said tray,
   spring means biasing said sector gear in one rotational direction,
   a second gear rotatably mounted on said support and movable through a 360° arc,
   gear teeth formed on said second gear through a portion only of the circumference thereof and positionable in mesh with said sector gear to drive said sector gear in opposition to said spring means,
   a drive gear,
   an oscillatable one-way clutch interconnecting said drive gear and said second gear,
   a rectilinearly movable gear rack drivingly connected with said drive gear to oscillate said drive gear,
   power means for effecting rectilinear movement of said gear rack,
   a plurality of mold wells formed within said tray,
   a water trough formed along one side of said tray for carrying water between adjacent molds therein,
   means for filling said tray with water,
   stop means positioned within the path of said sector gears to limit the degre of rotatable movement thereof under the bias of said spring means,
   wherein said tray is positioned so that said trough is raised above the level of water within said molds when said sector gear is in engagement with said stop means,
   and means tipping said trays during filling thereof to position said trough below the water level of said molds.

4. The structure set forth in claim 3 wherein said means for tipping said tray comprise:
   an extension from said sector gear and a protruding nib on said drive gear which are engageable with one another during filling of said ice tray.

5. An ice making apparatus comprising:
   a support,
   an ice tray mounted for rotatable movement on said support and within a freezing compartment, wherein ejection of ice blocks from said tray is effected by rotating said tray through a predetermined arc,
   a sector gear connected to and co-rotatable with said tray,
   spring means biasing said sector gear in one rotational direction,
   a second gear rotatably mounted on said support and movable through a 360° arc,
   gear teeth formed on said second gear through a portion only of the circumference thereof and positionable in mesh with said sector gear to drive said sector gear in opposition to said spring means,
   a drive gear,
   an oscillatable one-way clutch interconnecting said drive gear and said second gear,
   a rectilinearly movable gear rack drivingly connected with said drive gear to oscillate said drive gear, and
   power means for effecting rectilinear movement of said gear rack.

6. An ice making apparatus comprising:
   a support,
   an ice tray mounted for rotatable movement on said support and within a freezing compartment, wherein ejection of ice blocks from said tray is effected by rotating said tray through a predetermined arc,
   a sector gear connected to and co-rotatable with said tray,
   a second gear rotatably mounted on said support and movable through a 360° arc,
   gear teeth formed on said second gear about a portion only of the circumference thereof and positioned in mesh with said sector gear,
   a drive gear,
   oscillatable one-way clutch interconnecting said drive gear and said second gear,
   a rectilinearly movable gear rack drivingly connected with said drive gear to oscillate said drive gear, and
   thermal sensitive power means sensitive to the air within said freezing compartment ambient said ice tray for effecting rectilinear movement of said gear rack as a function of such temperature.

7. An ice making apparatus comprising:

a support, an ice tray mounted for rotatable movement on said support and within a freezing compartment, wherein ejection of ice blocks from said tray is effected by rotating said tray through a predetermined arc, a sector gear connected to and co-rotatable with said tray, spring means biasing said sector gear in one rotational direction, a second gear rotatably mounted on said support and movable through a 360° arc, gear teeth formed on said second gear through a portion only of the circumference thereof and positionable in mesh with said sector gear to drive said sector gear in opposition to said spring means, a drive gear, an oscillatable one-way clutch interconnecting said drive gear and said second gear, and power means drivingly connected to said drive gear for oscillating said drive gear.

References Cited by the Examiner
UNITED STATES PATENTS

| | | |
|---|---|---|
| 1,974,054 | 9/34 | Popp. |
| 2,949,749 | 8/60 | Reddi _____ 62—354 X |
| 3,001,092 | 9/61 | Nemeth _____ 74—126 X |
| 3,026,684 | 3/62 | Chace _____ 62—343 X |
| 3,071,933 | 1/63 | Shoemaker _____ 62—71 |

ROBERT A. O'LEARY, *Primary Examiner.*